United States Patent Office 3,132,154
Patented May 5, 1964

3,132,154
PRODUCTION OF ASCORBIC ACID ESTERS
Hans Meyer-Döring, Cranaehstrasse 49, Hamburg-Gross-Flottbek, Germany
No Drawing. Filed Jan. 9, 1958, Ser. No. 707,858
Claims priority, application Germany Dec. 7, 1953
10 Claims. (Cl. 260—343.7)

The present invention relates to a process for the preparation of a water soluble therapeutic compound which can exert an antibacterial effect. This effect is bactericidal or bacteriostatic according to the concentrations or conditions of use and no harmful secondary effects are produced in the body. The present invention relates further on to new water soluble therapeutic compounds with improved properties.

The bactericidal effect of ascorbic acid is known. However, ascorbic acid is most readily destroyed or oxidized by ascorbinase to dehydroascorbic acids and further to ineffective compounds. This oxidation, unfortunately, will be enhanced in an infected body or in an inflamed tissue, just when the need for ascorbic acid is most necessary.

It is known to stabilize ascorbic acid by mixing it with amino acids, such as cystine, cysteine or glutathione, or vice versa to stabilize amino acids with ascorbic acid. Those stabilized products are mere mixtures with less therapeutic value which only can be compensated by the use of larger doses.

I have found a new process for preparing water soluble antibacterial compounds having improved bacteriostatic or bactericidal effects which cannot be achieved by the former known mixtures or simple salts of the components. Furthermore, I have found new compounds having a better stability in the body, and being not subjected to such a rapid and strong catabolism in the body as ascorbic acid alone. Their increased stability enables these products to exert their effect at the place where they are used by the body for preventing injuries or for combating illness. As a particular advantage, however, it is to be emphasized that the use of my new antibacterial compounds do not engender any injurious secondary effects, such as, for example, harm to the blood, damage to the intestinal flora, allergic phenomena or dermatitis.

It is astonishing that a small amount, for example, 0.03–1.0 mg. per mouse, of my new compounds would be sufficient, as proved by experiments with animals, to produce therapeutic effects which are substantially equal or even far superior to those of known bactericidal agents, such, for example, as sulphonamides or antibiotics. This is due to a decided potentizing effect, which cannot be achieved by simultaneous or successive doses of the components alone or by mere mixtures.

According to the process of my invention, the antibacterial compounds are obtained by reacting ascorbic acid with naturally occurring amino acids. In the following the term "ascorbic acid" covers also the following compounds as listed in Table I:

TABLE I

Ascorbic acid,
Sodium ascorbate,
Potassium ascorbate,
Calcium ascorbate, and
Mixtures of the above-mentioned substances.

The term naturally occurring amino acids covers such with or without a SH— group or a S—CH₃— group; those amino acids could be used as such or in the form of their salts or their acid chlorides and are listed in Table II:

TABLE II

Glycine, alanine, leucine, isoleucine, tyrosine, cystine glutamic acid;
Cysteine, homocysteine, glutathione;
Methionine, ethionine;
Mixtures of the above-mentioned substances.

According to the invention the ascorbic compounds as listed in Table I are reacted in liquid medium with the amino compounds as listed in Table II which are in dispersion or solution. The reaction product is separated from the reaction mixture, and if necessary purified by crystallization. To ensure a rapid and complete reaction and to form highly effective products, the reaction preferably is carried out at elevated temperatures, for example at temperatures between 30 and 130° C., more especially between 35 and 80° C. The generally water soluble reaction components may be brought together in aqueous medium. It is, however, also possible to use organic liquids and to have one of the components in a finely divided dispersion. For example, if sodium ascorbate is used, an alcoholic susepension is suitable.

It is advantageous to carry out the reaction with exclusion of oxygen and to conduct it in a nitrogen atmosphere.

The ratio of the amino acid compound to the ascorbic compound may fluctuate within certain limits but it is expedient to maintain them within the molar ratios 2:1 and 1:2 inclusively.

When having a molar ratio between the two reacting components of 1:1, the reaction according to my invention could be symbolized by the following formulae:

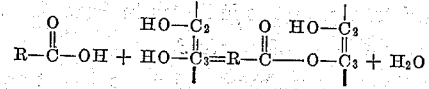

in which R is a residue of a naturally occuring amino acid without the COOH group as listed in Table II; $C_2$ and $C_3$ are the second and the third carbon atoms of an endiol containing ascorbic compound, respectively.

When the molar ratio 2:1 (amino compound:ascorbic compound) is used the enol-linkage between the two amino compounds and the one ascorbic compound will take place at both carbon atoms of the latter, namely at the second and third carbon of the ascorbic compound.

When the molar ratio 1:2 (amino compound:ascorbic compound) is used there will be only one enol linkage between the acid group of the amino compound and the third carbon atom of one mol of the ascorbic compound. It is assumed that the other mol of the ascorbic compound is coupled with the amino group of the amino acid by a probably complex linkage.

The reaction according to my invention can be promoted by carrying out the reaction in the presence of substances which promote esterification, such as acids. Advantageously hydrochloric acid could be used.

I found that adding of thionyl chloride or boron trifluoride will promote the esterification reaction. In this case it is assumed that the enol linkage occurs by reaction of the chlorine atom of a previously or intermediately formed acid chloride of the naturally occurring amino acid; said chlorine atom reacts with the hydrogen atom of the enolic OH-group of the ascorbic compound, or the sodium atom, for instance, when sodium ascorbate is used. Here, the presence of a dehalogenating agent such as sodium carbonate or pyridine will give a smoother reaction.

My new antibacterial compounds, therefore, when a 1:1 molar ratio (amino compound:ascorbic compound) is used have the following formula:

wherein X is a radical of a naturally occuring amino acid as listed in Table II and $C_3$ being the third carbon atom of an endiol radical of an ascorbic compound as listed in Table I.

When using a molar ratio of 2:1 (amino compound: ascorbic compound) not only the third but also the second carbon atom is coupled with the amino compounds. These new water soluble antibacterial compounds have the following formula:

The following examples are illustrative of my invention:

Example 1

3.52 parts of anhydrous ascorbic acid and 3.15 parts of anhydrous cysteine hydrochloride are dissolved with heating in a nitrogen atmosphere in 40 parts of absolute alcohol. After cooling to room temperature, 0.2 part of freshly distilled thionyl chloride is added. The mixture is then left to stand for 24 hours. It is concentrated under reduced pressure down to a volume of about 25 parts and thereafter precipitated with 250 parts of dried ether. The precipitate is oily first of all, but solidifies after a time into a white crystalline mass. The precipitate is filtered with suction and dried. The yield is practically quantitative.

Example 2

3.52 parts of anhydrous ascorbic acid and 3.15 parts of anhydrous cysteine hydrochloride are dissolved with heating in 40 parts of absolute alcohol. After cooling, about 0.3 part of boron trifluoride is introduced. The further treatment is carried out as indicated in Example 1.

Example 3

25 parts of acetone are poured on to 1 part of anhydrous cysteine hydrochloride and 8 parts of anhydrous ascorbic acid in a nitrogen atmosphere and 0.1 part of thionyl chloride is added. The mixture is then left to stand for 48 hours in the dark at room temperature. It is filtered off with suction, the precipitate is washed with a little acetone and the filtrate precipitated with 150 parts of absolute ether. After 24 hours, the precipitate has become crystalline. The solvent is filtered off with suction and the precipitate washed with a little ether.

Example 4

6–8 cc. (0.05–0.06 mol) of ultra-pure freshly distilled thionyl chloride are added dropwise at 20° C. in the course of 10 minutes to 3.1 g. (0.02 mol) finely powdered (mesh 1600) anhydrous cysteine hydrochloride. The mixture is then heated in a water bath to 37° C. The evolution of gas which takes place is terminated after 25–30 minutes. In order to complete the reaction, the mixture is shaken for 3 to 4 hours and the product which is obtained is washed with dry petroleum ether. The residues of petroleum ether are removed in vacuo of 12–15 torr and at a temperature of 16° C.

1.9 g. (0.01 mol) of the cysteine acid chloride hydrochloride obtained in this manner are mixed at a temperature of 40–45° C. with 2.0 g. (0.01 mol) of sodium ascorbate, which has previously been finely suspended in 250 parts of absolute alcohol. Hereby sodium chloride is precipitated and the remaining solution becomes clear. The mixture is then kept for one night under an inert gas, for example nitrogen, the solution is then separated from the precipitated sodium chloride by decanting, and the alcohol is distilled off in vacuo at a temperature of 42° C. and under a nitrogen atmosphere of 25–30 torr. As the solution commences to become cloudy, precipitation is carried out with dry ether and the separated precipitation product is recrystallized from absolute alcohol.

A yield of about 2.2 g. colourless water soluble crystals is obtained having not a quite exact melting point and a molecular formula of $C_9H_{13}O_7NS \cdot HCl$.

The crystallographic test proves that the obtained rhombic crystals are of uniform character. Analytic investigation shows that the reaction product has still the double linkage because a positive iron ferrichloride reaction is obtainable; also the SH group remains unchanged in the reaction product which was proved by a positive sodium nitro prusside reaction. The coupling of cysteine takes place at the $C_2$ or $C_3$ atom which is proved by potentiometric titration and by a well defined maximum at 360 m$\mu$.

Example 5

According to the above Example 4, 2 molcysteine acid chloride hydrochloride and 1 mol ascorbic acid are coupled in the presence of silver carbonate; other carbonates may be used if necessary. The yield and the properties of the obtained crystals correspond to those as given in Example 4. The molecular formula is

Example 6

The reaction can also be carried out by reacting 1 mol of cysteine acid chloride hydrochloride obtained according to Example 4 with 1 mol sodium ascorbate and a further mol ascorbic acid; this is accomplished in the following manner:

A suspension of 0.01 mol or 1.9 g. of cysteine acid chloride hydrochloride in 50 cc. of petroleum ether (boiling point 50° C.) are mixed with 0.01 mol=1.76 g. ascorbic acid and with 0.01 mol=2.0 g. sodium ascorbate. The mixture is stirred under nitrogen atmosphere or by passing nitrogen through the reaction mixture for 4 hours at room temperature; simultaneously a slight vacuum is maintained. The solvent is then distilled off, ultimately at reduced pressure, then in vacuo. It is not necessary to separate the formed sodium chloride when the obtained product is used for therapeutical purposes. The strong bactericidal effect of the reaction product is considerably larger than the effect obtained with a mere mixture of those components; this also is an evidence for the reaction.

Example 7

The hydrochloride of methionine acid chloride is prepared from methionine and phosphorus pentachloride in carbon tetrachloride by the process described by S. Levine in J. Am. Chem. Soc., 76, 1382 (1954).

1.92 g. of this strongly hygroscopic compound are suspended with exclusion of moisture in 100 cc. of dry ether, a suspension of 1.98 g. of sodium ascorbate in 100 cc. of ether is added and the further process is carried out as described in Examples 1 and 2. After purification, there are obtained water soluble colourless prisms, the sulfur content of which is 9.1% and the nitrogen content 4.2%, which corresponds to an empirical molecular formula of $C_{10}H_{15}O_7NS \cdot HCl$.

Example 8

Alanine acid chloride by hydrochloride is prepared according to the method described in Example 7. 1.44 g. of said acid chloride are suspended with exclusion of moisture in 100 cc. of dry ether, a suspension of 1.76 g. ascorbic acid in 100 cc. of ether is added (whereby the ascorbic acid is partially dissolved in ether). Thereafter 1.06 g. finely powdered anhydrous sodium carbonate is added. After displacing the air contained in the vessel by nitrogen, the mixture is shaken or stirred for 3 hours at room temperature and thereafter for 12 hours at a temperature corresponding to the boiling point of ether.

The light coloured product obtained by filtration contained additionally sodium chloride and sodium carbonate and can be purified according to the method described in Example 4. The ethyl alcohol used for the extraction should have a pH-value of 6.0–6.5, which is obtained by adding alcoholic hydrochloric acid dropwise. The product obtained is water soluble and colourless, the yield of 2.0 g. has a molecular formula of $C_9H_{13}O_7N \cdot HCl$ and an expected nitrogen content of 4.9%.

*Example 9*

The same method as in Example 8 is used, but 0.79 g. pyridine are added instead of sodium carbonate. The formed pyridine hydrochloride is removed by washing with methyl alcohol at room temperature. The reaction product is the same as the one in Example 8.

Also acid chlorides of cystine, leucine, tyrosine, acetyl methionine, ethionine could be used as reactants with ascorbic acid, sodium ascorbate, monomethyl ascorbic acid or other ascorbic compounds as listed in Table I. The special conditions of the reaction correspond to those of the above mentioned examples and could be changed within certain limits by a person skilled in the art.

Relatively large series of comparative tests on animals were carried out with the products prepared according to my invention. Highly virulent cultures were employed for these tests with mice having an average weight of 10–15 g.; the cultures were used in an amount being 20 times stronger than the minimal lethal dose and being in the form in which they originate from human beings, after they had passed through five animals to increase their virulence. The following cultures were used:

Pneumococcus, *Streptococcus haemolyticus*, *Staphylococcus pyogenes* (*haemolyticus*) *and Bacterium coli haemolyticum*. In some cases Staphylococcus, Oxford strain, and *Streptococcus haemolyticus* Aronson were used. Mice (controls animals and test animals) were intraperitoneally infected with these bacteria, with three platinum-wire loops in each case. After different time intervals (up to 4½ hours after infection) the test animals received a single dose of the treatment medium in increasing amounts according to the time interval. The untreated control animals died, whereas the test animals treated with the products according to my invention in the amount of 0.04–0.3 mg. per mouse lived. In comparison, the same effect is obtained by using sulphonamides in the amount of 12 mg. per mouse, and 0.02–0.2 mg. per mouse by using anti-biotics, such as teramycin or aureomycin.

The mere mixture of the components, for instance cysteine hydrochloride and ascorbic acid or sodium ascorbinate in a physiological sodium chloride solution are without any bactericidal effect. The animals treated with those mixtures died in the same way as the untreated control animals; only some dubious effects were obtained when increasing the amount 200–500 times.

While the invention has been described, it is not intended to be limited to the details given, since various modifications or changes may be made without departing in any way from the spirit of my invention. This application is a continuation-in-part of application Serial No. 471,908, filed November 29, 1954, now abandoned.

What I claim as new and desired to be secured by Letters Patent is:

1. A process for the preparation of an ester of an amino acid selected from the group consisting of glycine, alanine, leucine, isoleucine, tyrosine, cystine, glutaminic acid, cysteine, homocysteine, gluthathione, methionine and ethionine with ascorbic acid which comprises heating under exclusion of oxygen an endiol compound selected from the group consisting of ascorbic acid, its alkali metal salts and its alkaline earth metal salts with a compound selected from the group consisting of glycine, alanine, leucine, isoleucine, tyrosine, cystine, glutaminic acid, cysteine, homocysteine, gluthathione, methionine, ethionine and their hydroclorides in a waterfree and indifferent liquid medium selected from the group consisting of absolute alcohol, acetone, ethyl ether and petroleum ether at a temperature between 30 and 130° C. in the presence of a catalyst selected from the group consisting of hydrochloric acid, thionyl chloride and boron trifluoride and recovering the reaction product from the reaction mixture in solid form.

2. A process for the preparation of an ester of an amino acid selected from the group consisting of glycine, alanine, leucine, isoleucine, tyrosine, cystine, glutaminic acid, cysteine, homocysteine, glutathione, methionine and ethionine with ascorbic acid which comprises heating under exclusion of oxygen ascorbic acid with an acid chloride of a naturally occurring amino acid selected from the group consisting of glycine, alanine, leucine, isoleucine, tyrosine, cystine, glutaminic acid, cysteine, homocysteine, glutathione, methionine, ethionine and their hydrochlorides in a waterfree and indifferent liquid medium selected from the group consisting of absolute alcohol, acetone, ethyl ether and petroleum ether, at a temperature between 30 and 130° C. in the presence of an alkaline compound selected from the group consisting of silver carbonate, sodium carbonate and pyridine and recovering the reaction product from the reaction mixture in solid form.

3. The process of claim 2 in which the ratio of the endiol compound and the second compound reacted is from 2:1 to 1:2.

4. The process of claim 2 in which the reaction is carried out in a dry nitrogen atmosphere.

5. A process for the preparation of an ester of amino acid selected from the group consisting of glycine, alanine, leucine, isoleucine, tyrosine, cystine, glutaminic acid, cysteine, homocysteine, glutathione, methionine and ethionine with ascorbic acid which comprises heating under exclusion of oxygen an endiol compound selected from the group consisting of the alkali metal salts and alkaline earth metal salts of ascorbic acid with an acid chloride of a naturally occuring amino acid selected from the group consisting of glycine, alanine, leucine, isoleucine, tyrosine, cystine, glutaminic acid, cysteine, homocysteine, glutathione, methionine, ethionine and their hydrochlorides in a waterfree and indifferent liquid medium selected from the group consisting of absolute alcohol, acetone, ethyl ether and petroleum ether, at a temperature between 30 and 130° C. and recovering the reaction product from the reaction mixture in solid form.

6. The process of claim 5 in which the ratio of the endiol compound and the second compound reacted is from 2:1 to 1:2.

7. The process of claim 5 in which the reaction is carried out in a dry nitrogen atmosphere.

8. A process for the preparation of an ester of cysteine with ascorbic acid which comprises heating under exclusion of oxygen sodium ascorbate with cysteine acid chloride hydrochloride in absolute alcohol at a temperature between 35 and 80° C. and recovering the reaction product from the reaction mixture in solid form.

9. The process of claim 1 in which the ratio of the endiol compound and the second compound reacted is from 2:1 to 1:2.

10. The process of claim 1 in which the reaction is carried out in a dry nitrogen atmosphere.

References Cited in the file of this patent

UNITED STATES PATENTS

| | | |
|---|---|---|
| 2,134,246 | Elger | Oct. 25, 1938 |
| 2,350,435 | Wells | June 6, 1944 |
| 2,419,230 | Ruskin | Apr. 22, 1947 |
| 2,539,483 | Ruskin | Jan. 30, 1951 |
| 2,585,580 | Opplt | Feb. 12, 1952 |

(Other references on following page)

FOREIGN PATENTS 752,547    Great Britain _____ July 11, 1956

OTHER REFERENCES

Bersin et al.: Hoppe Seyler's Zeit. für Physiol Chemie, volume 235, pages 12–18 (1935).

Abderhalden: "Fermentforschung," volume 15, pages 522–528 (1938).

Kawerau et al.: "Scientific Proceedings Royal Dublin Society," volume 23, pages 171 and 172 (1944).

Kappanyi et al.: "Science," volume 101 #2630, pages 541 and 542 (1945).

Otani et al.: "Jap. J. Med. Sci. II; Biochem. 4," No. 4, page 100 (1948).

Meyer-Döring: Nature, vol. 174, pp. 555–556 (Sept. 18, 1954).

Runti: Chemical Abstracts, vol. 49, p. 14273b (1955).